Nov. 1, 1927.

C. A. HAUSSER 1,647,865

MARKING FOR HÆMACYTOMETERS

Filed Aug. 6, 1924

Inventor.
Carl Adolph Hausser
by his Attorneys.
Howson & Howson

Patented Nov. 1, 1927.

1,647,865

UNITED STATES PATENT OFFICE.

CARL ADOLPH HAUSSER, OF PHILADELPHIA, PENNSYLVANIA, ASSIGNOR TO C. A. HAUSSER & SON, OF PHILADELPHIA, PENNSYLVANIA, A FIRM CONSISTING OF CARL ADOLPH HAUSSER AND ANTHONY ADOLPH HAUSSER.

MARKING FOR HÆMACYTOMETERS.

Application filed August 6, 1924. Serial No. 730,531.

This invention relates to hæmacytometers and similar devices having marked areas, constituting counting chambers, scales, or the like, and the principal object of the invention is to provide a novel and improved marking, obviating much of the confusion and difficulty encountered in the use of the present forms of such appliances and materially facilitating the counting and other operations.

Figure 1:
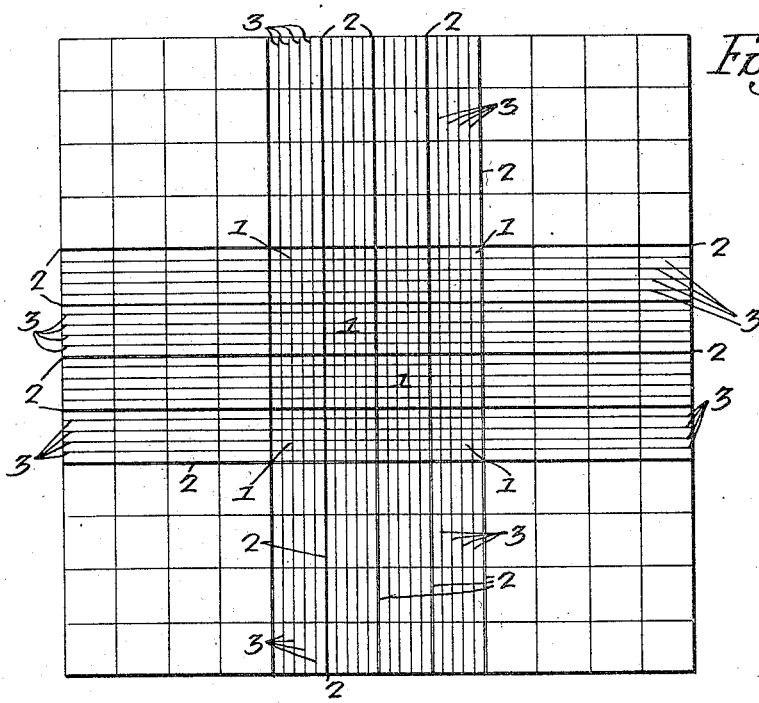
Figure 2:
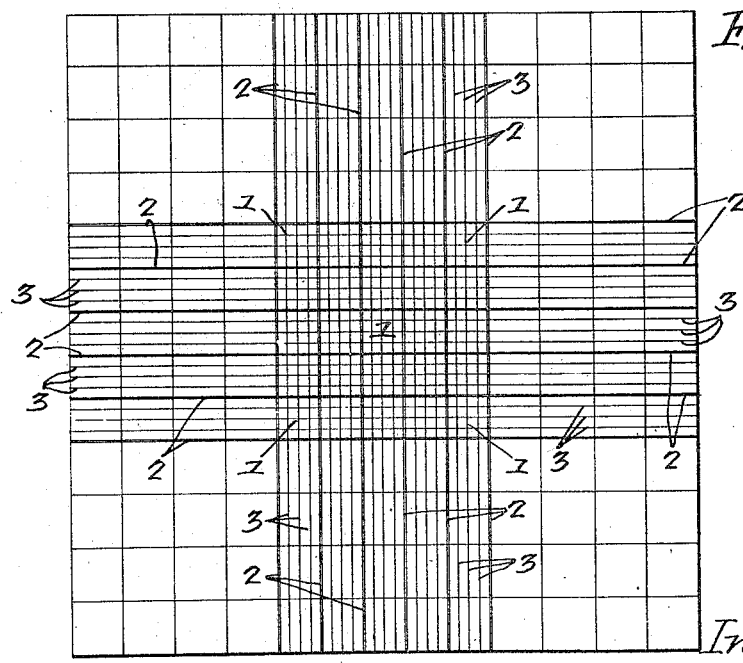

In the attached drawings:

Figures 1 and 2 each show hæmacytometer markings made in accordance with my invention.

With reference to the drawings, it will be noted that the new system of marking comprises the usual primary divisions 1, created by the intersecting lines 2. These divisions, or rather those of them which occupy the center of the field where the counting operations are carried out, are, in turn, subdivided by a number of lines 3, parallel to the primary dividing lines 2, which collectively serve to effect a redivision of each of the larger divisions 1.

It will be observed that those of the primary divisions 1 which comprise the center of the field, are, in each case, defined by two etched lines, spaced in close proximity, and that the transparent interval therebetween, which may be approximately of the same width as the opaque lines or even less, constitutes the actual bounding line which is used in the operation of counting. Herein resides the essence of the invention, for this feature very materially lessens the difficulty and confusion, together with the undue eye-strain, which is an inevitable accompaniment of the type of hæmacytometers now in use.

It is, of course, apparent that this invention is not to be restricted to the forms here shown and described, as regards numbers of lines or divisions, but is subject to many modifications involving the use of the improved divisional boundary or marking elements herein described and illustrated. Nor is the invention limited to hæmacytometers, since the marking in principle is applicable to numerous forms of slides used in connection with the microscope.

I claim:

1. A defining line for hæmacytometers and like microscope slides consisting of the transparent line between two closely adjacent parallel opaque lines.

2. A system of marking for hæmacytometers and like microscope slides comprising both opaque and transparent division-defining lines.

3. A system of marking for hæmacytometers and like microscope slides comprising sets of lines defining divisions and subdivisions, one of said sets consisting of opaque lines and another set consisting of transparent lines.

4. A system of marking for hæmacytometers and like microscope slides comprising a set of transparent lines defining main divisions and a set of opaque lines defining subdivisions.

5. A system of marking for hæmacytometers and like microscope slides comprising an orderly arrangement of parallel opaque lines disposed in sets of pairs of closely adjacent parallel lines to define, by means of the transparent intermediate line, divisions of a surface area of the slide.

6. A system of marking for hæmacytometers and like microscope slides comprising an orderly arrangement of parallel opaque lines disposed in sets of pairs of closely adjacent parallel lines to define, by means of the transparent intermediate line, divisions of a surface area of the slide; with single opaque lines defining subdivisions.

7. A system of marking for hæmacytometers and like microscope slides comprising an orderly arrangement of transparent and opaque lines defining respectively divisions and subdivisions of a surface area of said slide.

8. A hæmacytometer or like microscope slide having thereon an orderly arrangement of transparent and opaque lines defining divisions and subdivisions of a surface area.

9. A hæmacytometer or like microscope slide comprising a plurality of intersecting sets of pairs of closely adjacent parallel opaque lines so arranged that adjacent areas are defined by the transparent lines between said pairs of opaque lines.

10. A hæmacytometer or like microscope slide having different surface areas defined respectively by transparent and opaque lines.

CARL ADOLPH HAUSSER.